(12) United States Patent
Cavallaro et al.

(10) Patent No.: US 8,218,656 B2
(45) Date of Patent: Jul. 10, 2012

(54) PULSE GENERATOR FOR ULTRA-WIDE-BAND MODULATING SYSTEMS AND MODULATING SYSTEMS USING IT

(75) Inventors: Marco Orazio Cavallaro, Catania (IT); Tino Copani, Riposto (IT); Giovanni Girlando, Catania (IT); Giuseppe Palmisano, San Giovanni la Punta (IT)

(73) Assignee: STMicroelectronics S.r.l., Agrate Brianza (IT)

( * ) Notice: Subject to any disclaimer, the term of this patent is extended or adjusted under 35 U.S.C. 154(b) by 0 days.

(21) Appl. No.: 12/960,757

(22) Filed: Dec. 6, 2010

(65) Prior Publication Data

US 2011/0135031 A1    Jun. 9, 2011

Related U.S. Application Data

(62) Division of application No. 11/318,052, filed on Dec. 23, 2005, now Pat. No. 7,869,524.

(51) Int. Cl.
*H04B 14/04* (2006.01)

(52) U.S. Cl. ........ 375/242; 375/146; 375/259; 375/295; 341/157

(58) Field of Classification Search ............ 375/242, 375/259, 295, 146; 341/157
See application file for complete search history.

(56) References Cited

U.S. PATENT DOCUMENTS

| | | | |
|---|---|---|---|
| 4,312,238 A * | 1/1982 | Rey | 73/861.28 |
| 6,348,785 B2 | 2/2002 | Wohlfarth | |
| 6,515,622 B1 | 2/2003 | Izadpanah et al. | |
| 6,611,223 B2 * | 8/2003 | Low et al. | 341/157 |
| 7,010,056 B1 | 3/2006 | McCorkle et al. | |
| 7,027,493 B2 | 4/2006 | Richards | |
| 7,376,191 B2 | 5/2008 | Melick et al. | |
| 2004/0086001 A1 | 5/2004 | Miao et al. | |
| 2004/0258133 A1 | 12/2004 | Lee et al. | |

FOREIGN PATENT DOCUMENTS

WO    0139451    5/2001

OTHER PUBLICATIONS

H. Kim, D. Park, and Y. Joo, "Design of CMOS Shotlz's Monocycle Pulse Generator", IEEE 7803-81887-4 2003, pp. 81-85.
J.F.M. Gerrits and J.R. Farserotu, "Wavelet generation circuit for UWB impulse radio applications", Electronics Letters, Dec. 5, 2002, vol. 38, No. 25, pp. 1737-1738.
Ian Gresham and Alan Jenkins, "A Fast Switching, High Isolation Absorptive SPST SiGe Switch for 24 GHz Automotive Applications", 33rd European Microwave Conference, Munich 2003, pp. 903-906.
International Search Report for International Patent Application No. PCT/US99/27986, dated Apr. 5, 2000.

* cited by examiner

*Primary Examiner* — Ted Wang
(74) *Attorney, Agent, or Firm* — Graybeal Jackson LLP

(57) ABSTRACT

A pulse generator circuit is provided. The pulse generator circuit has an input adapted to receive an input electrical quantity and an output at which an output electrical quantity is made available. A transfer characteristic establishes a relationship between said input and said output electrical quantities. The pulse generator circuit is adapted to provide said output electrical quantity in the form of pulses having a predetermined shape, suitable to be used for UWB transmission. The transfer characteristic has substantially a same shape as that of said pulses. Moreover, a UWB modulating system exploiting the novel pulse generator is proposed.

17 Claims, 15 Drawing Sheets

PULSE GENERATOR FOR ULTRA-WIDE-BAND MODULATING SYSTEMS AND MODULATING SYSTEMS USING IT

PRIORITY CLAIM

The present application is a Divisional of U.S. patent application Ser. No. 11/318,052, filed Dec. 23, 2005, now U.S. Pat. No. 7,869,524; which application is incorporated by reference herein in its entirety.

TECHNICAL FIELD

The present disclosure relates to the radio communications field. More specifically, the present disclosure relates to the Ultra-Wide Band (UWB) radio communications field, and in particular it relates to the generation of UWB electromagnetic pulses.

BACKGROUND

UWB refers to a radio communications technique fundamentally different from all the other radio frequency communications systems, referred to as "narrowband systems". Without entering into excessive details, well known to those skilled in the art, modulated low-energy pulses of very short duration, typically less than one nanosecond are used to transmit data, whereby the occupied bandwidth has very broad values. According to a definition of the U.S. Federal Communications Commission (FCC), a UWB system is a radio system having a bandwidth greater than 20% of the center frequency measured at the −10 dB points, or, alternatively, having an RF bandwidth greater than 500 MHz. On Feb. 14, 2002, the FCC allocated limited use of spectrum between the interval 3.1-10.6 GHz for signals operating in UWB systems (in short, UWB signals).

The main concern regarding a UWB system is that it occupies a portion of spectrum wherein other narrowband systems already operate, so a regulation is necessary in order to avoid coexistence (e.g., interference) problems. Therefore, a regulatory authority like the FCC has to set strict limitations in the maximum emission for UWB signals, thus guaranteeing protection to the already existing and deployed radio services. UWB signal transmissions, following the FCC rules, must have a power spectral density below the involuntary electromagnetic emission level.

A UWB transmitter has to generate UWB pulse signals whose spectrum is compatible with the regulations, both in term of the frequency interval and of the maximum emission.

U.S. Pat. No. 6,515,622 discloses an antenna system making use of UWB pulse signals, and describes a technique for generating them based on step recovery diodes. However, this technique is not compatible with integrated circuit architectures, and is not adapted to control the shape of the generated pulse signals.

A typical category of UWB pulse signals that are compatible with the regulatory prescriptions of the national/supernational authorities and that can be easily varied in shape consists of the family of the monocycle wavelets. A Gaussian monocycle wavelet is a short-duration wave having, in the time domain, a shape represented by a Gaussian derivative.

A first solution known in the art for generating a monocycle wavelet is described by H. Kim, D. Park and Joo Y., in "Design of CMOS Shotlz's Monocycle pulse generator", IEEE 7803-8187-4 2003, p. 81. According to this solution, a monocycle wavelet of the second order (i.e., corresponding to the second time derivative of a Gaussian pulse) is generated by differentiating a signal having the shape of a hyperbolic tangent by means of a squarer circuit coupled to a high-pass filter. However, this solution is adapted to low-frequency applications only. Moreover, since the generated monocycle wavelet is of the second order, its spectrum does not properly match with the spectral interval allowed by the FCC, unless a further filtering operation is performed. However, the further filtering operation increases the pulse duration, resulting in a degradation of the transmission.

An alternative solution for generating a monocycle wavelet is described by J. F. M. Gerrits and Farserotu, in "Wavelet generation circuit for UWB impulse radio applications", Electronics Letters, 5 Dec. 2002, Vol. 38 n. 25, p. 1737. The document describes a circuit capable of approximating a monocycle wavelet of the second order by means of sums and differences of signals with the shape of a hyperbolic tangent. This solution has substantially the same drawbacks as the previous solution.

Another technique for obtaining a monocycle wavelet, or at least to obtain an approximate version thereof, consists of modulating a sinusoidal signal (the "carrier signal") with a modulating signal pulse of suitable shape (in the time domain), thereby obtaining a modulated sinusoidal carrier monocycle with envelope corresponding to the shape of the modulating signal pulse. An advantageous method for obtaining a monocycle wavelet having a spectra suitable for a UWB transmission under e.g. the FCC rules, consists of using modulating signal pulses having the shape that is as close as possible to a Gaussian.

I. Gresham and A. Jenkins describe in "A Fast Switching, High Isolation Absorptive SPST SiGe Switch for 24 GHz Automotive Applications", 33rd European Microwave Conference, Munich 2003, pag. 903-906, a UWB pulse generator circuit that generates a square-envelope modulated monocycle by multiplying a high frequency sinusoidal wave by a square modulating pulse. This circuit includes a switch circuit having a very short switching time, being based on the $E^2CL$ architecture. Although this circuit is adapted to operate at high frequencies, the spectrum of a square-envelope modulated monocycle can not be entirely confined in the spectral interval allowed by the FCC, because it is characterized by having (ideally infinite) lateral lobes.

The International Application WO 0139451 describes a UWB data transmission system that generates low level voltage pulses. The shape of the low level voltage pulses can be varied by means of an adjustable shaping filter. Once shaped, the voltage pulses are used for modulating a sinusoidal signal, in such a way to obtain the UWB pulse signals necessary for the transmission of data. This solution allows modification to some extent the shape of the low level voltage pulses, and consequently modifying the shape of the UWB pulse signals spectrum. However, the shaping capability given by the shaping filter is limited, and the spectrum is scarcely controllable, which is also worsened by the circuit complexity of the shaping filter itself.

SUMMARY

An aspect of the present disclosure provides a pulse generator circuit. The pulse generator circuit has an input adapted to receive an input electrical quantity and an output at which an output electrical quantity is made available. A transfer characteristic establishes a relationship between said input and said output electrical quantities. The pulse generator circuit is adapted to provide said output electrical quantity in the form of pulses having a predetermined shape, suitable to be used for UWB transmission. The transfer characteristic has substantially a same shape as that of said pulses.

Another aspect of the present disclosure relates to a UWB modulating system for modulating at least one carrier signal with predetermined duration enveloping pulses. The UWB modulating system includes a carrier generator adapted to generate the at least one carrier signal at a respective frequency, a pulse generator circuit for generating said enveloping pulses having a predetermined shape, suitable to be used for UWB transmission, and a multiplier circuit adapted to multiply the at least one carrier signal with said enveloping pulses. The pulse generator circuit includes an input adapted to receive an input electrical quantity, an output at which an output electrical quantity is made available in form of said enveloping pulses and a transfer characteristic establishing a relationship between said input and said output electrical quantities. The transfer characteristic has substantially a same shape as that of said pulses. The UWB modulating system further includes a driver circuit adapted to generate the input electrical quantity fed to the input of the pulse generator circuit.

DETAILED DESCRIPTION

The following discussion is presented to enable a person skilled in the art to make and use the disclosure. Various modifications to the embodiments will be readily apparent to those skilled in the art, and the generic principles herein may be applied to other embodiments and applications without departing from the spirit and scope of the present disclosure. Thus, the present disclosure is not intended to be limited to the embodiments shown, but is to be accorded the widest scope consistent with the principles and features disclosed herein.

Figure 1:
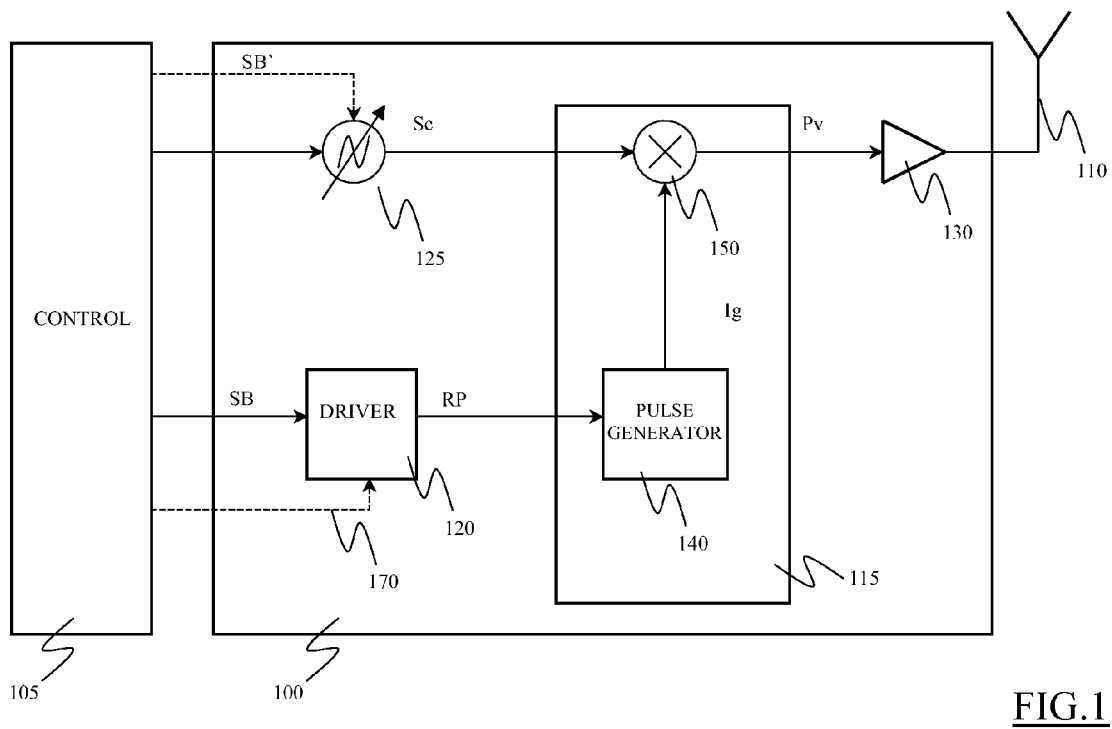
FIG. 1 is a block diagram of a UWB transmitter according to an embodiment of the disclosure.

Referring to FIG. 1, a UWB modulating system, in particular a UWB transmitter 100, is schematically illustrated according to an embodiment of the present disclosure. Adopting a Pulse Position Modulation (PPM) technique, the UWB transmitter 100 is adapted to receive a data stream, for example in the form of a modulated digital signal SB carrying a stream of bits $b_i$, generated by a binary source included in a control block 105, and to generate a corresponding train of modulated UWB pulse signals. Each bit $b_i$ can take a high logic value "1" (for example, associated to the value of a supply voltage Vcc), and a low logic value "0" (for example, associated with a ground voltage GND). The train of modulated UWB pulse signals, conveying the information carried by the data stream, i.e. by the modulated digital signal SB, is then radio-transmitted by means of an antenna 110. The correlation between bit values $b_i$ and UWB pulse signals is established by the modulation technique that is adopted for modulating the digital signal SB. According to the PPM technique, the position of the generic UWB pulse signal depends on the value, "1" or "0", of the corresponding bit $b_i$ in the data stream. Adopting instead a Pulse Amplitude Modulation (PAM) technique, it is the amplitude of the generic UWB pulse signal that depends on the value assumed by the corresponding bit $b_i$.

The UWB transmitter 100 includes a UWB pulser 115, having a first input terminal coupled to an output terminal of a driver circuit block 120 fed by the modulated digital signal SB, a second input terminal coupled to an output terminal of a sine wave generator block 125, and an output terminal coupled to an input terminal of an output stage circuit 130, having an output terminal coupled to the antenna 110. The driver circuit block 120 and the sine wave generator block 125 have input terminals coupled to the control block 105.

When the UWB transmitter 100 has to transmit information, the driver circuit block 120 receives the data stream, i.e., the digital signal SB modulated adopting, for example, a PPM technique, and generates a corresponding signal adapted to drive the UWB pulser 115. In particular, the driver circuit block 120 generates a corresponding square wave signal RP. Moreover, the sine wave generator block 125 generates a sinusoidal signal Sc of frequency fc; preferably, the sine wave generator block 125 is adapted to generate a sine wave voltage signal having a frequency fc variable (in a continuous or discrete way) within a predetermined frequency range, the frequency value being for example established by the control block 105. The UWB pulser 115 includes a pulse generator 140, controlled by the driver circuit block 120, and adapted to generate a signal pulse of carefully selected shape, for example a nearly-Gaussian pulse Ig, as will be more clear in the following description. The UWB pulser 115 further includes a signal multiplier block 150, having a first input terminal coupled to the output terminal of the sine waves generator block 125 for receiving the sinusoidal signal Sc, and a second input terminal coupled to the pulse generator 140 for receiving the nearly-Gaussian pulse Ig. The multiplier block 150 further includes an output terminal for providing a UWB signal pulse Pv, given by the product of the sinusoidal signal Sc by the nearly-Gaussian pulse Ig. An output stage circuit 130 allows coupling the output of the UWB pulser 115 with the antenna 110, without degrading the spectra of the UWB signal pulse Pv.

Alternatively, a Binary Phase Shift Keying modulation (BPSK) technique may be adopted: the data stream is provided to the sine wave generator block 125 in the form of a modulated digital signal SB' carrying a stream of bits $b'_i$, and the sine wave generator block 125 is driven by the control block 105 in such a way to modify the phase of the sinusoidal signal Sc depending on the values assumed by the bit $b'_i$ of the modulated digital signal SB'.

Figure 2A:
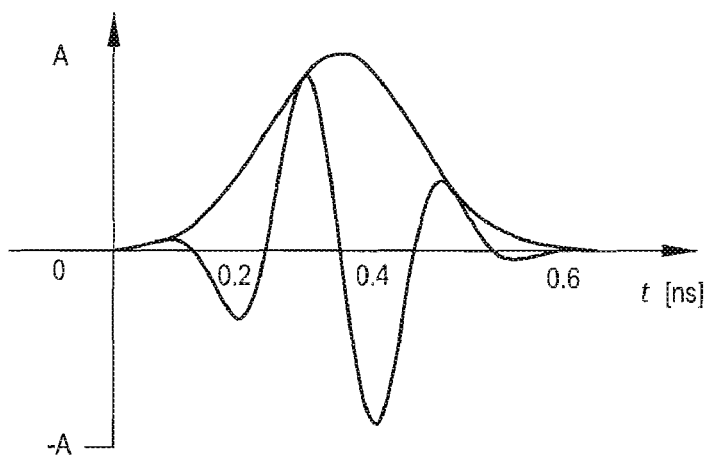
FIG. 2A is a diagram illustrating characteristics of a UWB signal pulse depending on time.

The qualitative trend of a UWB signal pulse Pv generated by the UWB pulser 115 as a function of time is illustrated in FIG. 2A. The UWB signal pulse is composed by a sinusoidal wave of frequency fc enveloped by a nearly-Gaussian pulse, and lasts some nanoseconds (being its bandwidth higher than 500 MHz). As known in the art, the spectrum of a sinusoidal wave enveloped by a Gaussian pulse is a Gaussian pulse too, having a center frequency (i.e., the frequency corresponding to the maximum amplitude of the Gaussian pulse) that corresponds to the frequency of the sinusoidal wave; neglecting the low-amplitude, side portions of the Gaussian spectrum, the spectral width of the resulting signal can be considered as confined.

Figure 2B:
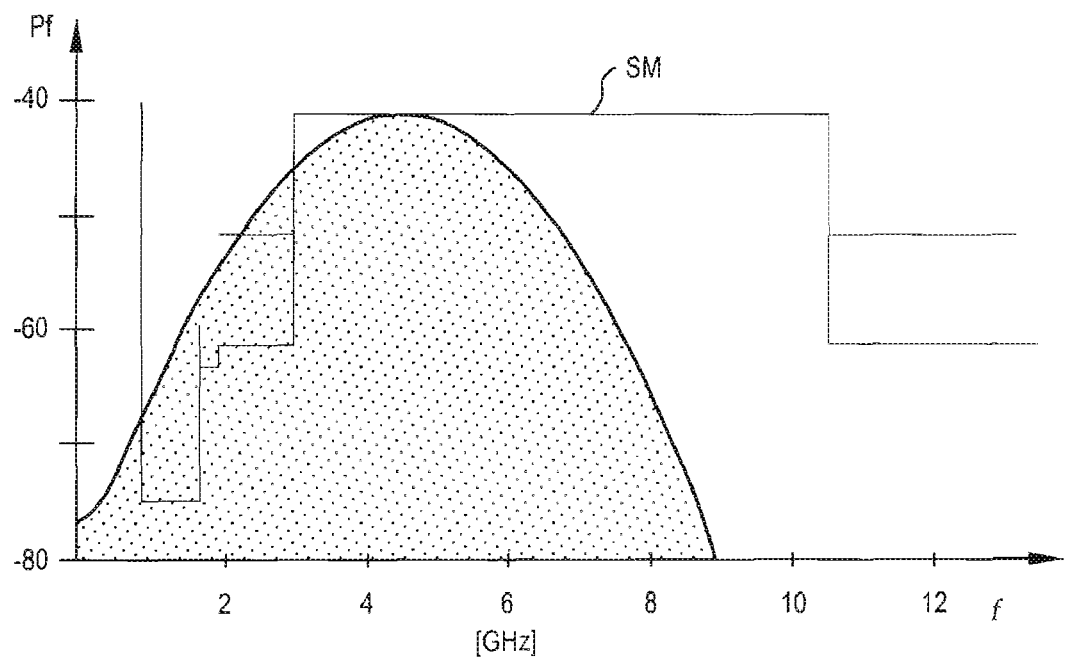
FIG. 2B is a diagram illustrating spectral characteristics of a UWB signal pulse depending on the frequency.

Similarly, the spectrum of the sinusoidal wave signal enveloped by the nearly-Gaussian pulse is given by the spectrum of the nearly-Gaussian pulse, shifted in frequency and centered at the frequency of the sinusoidal wave signal, as illustrated in FIG. 2B; the closer the nearly-Gaussian pulse resemble a Gaussian pulse, the more the spectrum Pf of the UWB signal pulse Pv is Gaussian. FIG. 2B shows a diagram of the power spectral density of the spectrum Pf versus frequency. Since the duration in time of the UWB signal pulse Pv is less than one nanosecond, the spectrum Pf has a corresponding width of several GHz. For being compatible with the FCC rules, the spectrum Pf has to be restricted within a spectral mask SM that begins at the frequency of 3.1 GHz and ends at the frequency of 10.6 GHz. Moreover, within this spectral mask, the power spectral density must have a higher limit value equal to −41 dBm/MHz.

By acting on the sine waves generator block 125, the control block 105 is capable to vary the frequency fc, shifting the entire spectrum Pf.

In a preferred embodiment of the present disclosure, the shape of the nearly-Gaussian pulse Ig (i.e., the UWB signal pulse envelope) can be varied, so as to adjust the shape of the spectrum Pf. In particular, according to an embodiment of the present disclosure, by properly modifying the square wave signal RP the shape of the nearly-Gaussian pulse Ig can be varied; to this end, the control block 105 acts (control line 170) on the driver circuit block 120 so as to modify the square wave signal RP.

The Applicant has found that for generating a pulse of a predetermined shape, an advantageous solution consists of properly stimulating the input of a circuit having a non-linear transfer characteristic, which shape closely approximates, as far as possible, the shape of the desired pulse. For this reason, in order to generate a nearly Gaussian pulse it is expedient to exploit a circuit whose transfer characteristic has a shape that approximates a Gaussian.

Figure 4A:
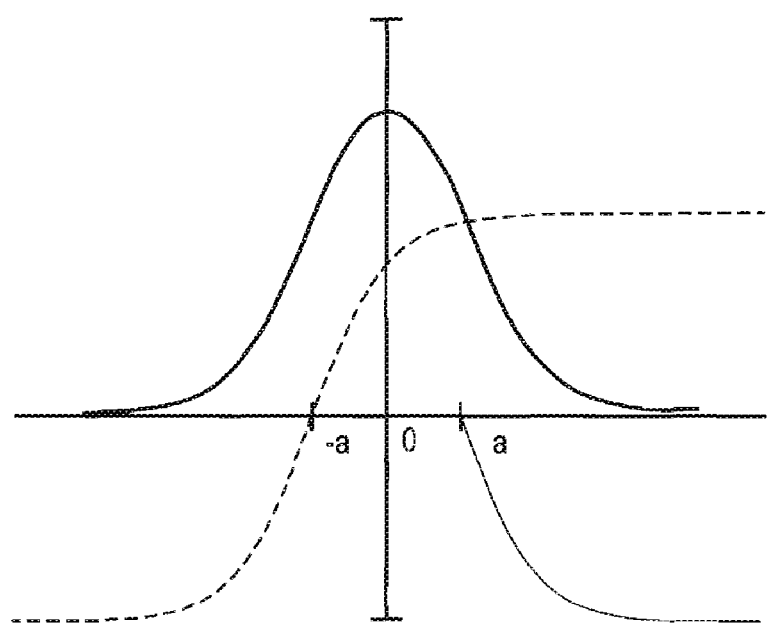
FIGS. 4A-4D are diagrams showing the behavior of a circuit having a transfer characteristic with a nearly Gaussian shape.

For better understanding the previous statements, reference will be now made to FIGS. 4A-4D, wherein the behavior of a circuit having a transfer characteristic y=NG(x) (x represents a generic input of the circuit, and y a generic output thereof) with a nearly Gaussian shape is analyzed. As can be seen in FIG. 4A, the nearly Gaussian shape of the transfer characteristic y=NG(x) is obtained by the overlap of two non-linear transfer characteristics, each one having the shape of a hyperbolic tangent:

$$y=NG(x)=A(\tan h(x+w)-\tan h(x-w)), \quad (1)$$

where A is an amplitude parameter and w is a width parameter.

Figure 4B:
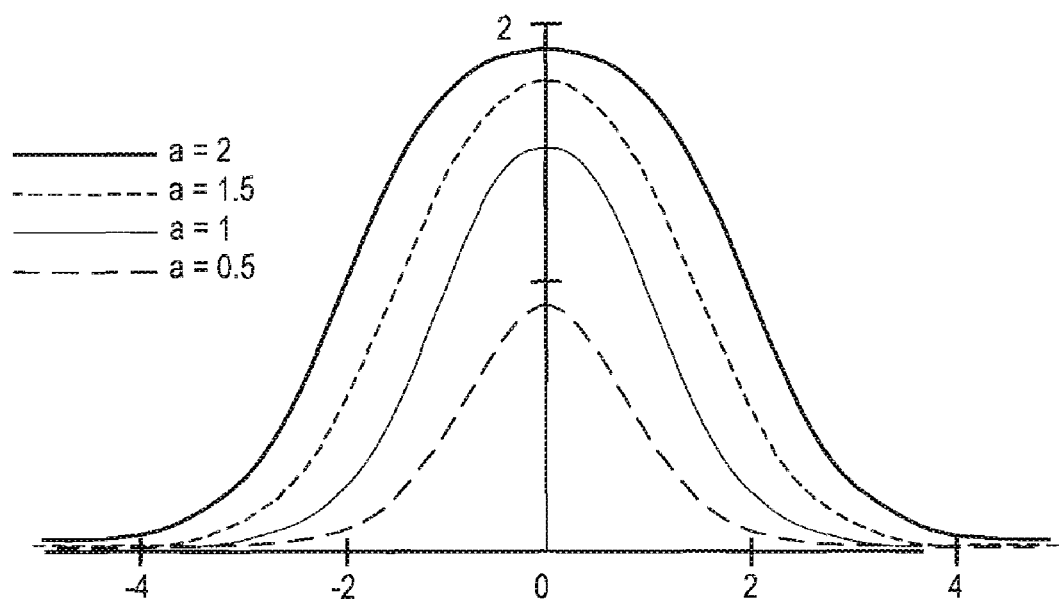

The amplitude parameter A establishes the amplitude of the transfer characteristic y=NG(x). The width parameter w establishes the shape and the width of the transfer characteristic y=NG(x), as illustrated in FIG. 4B, wherein a family of transfer characteristics y=NG(x) is depicted, depending on different values of the width parameter w: the higher the value of the width parameter w, the wider the shape of the transfer characteristic y=NG(x).

Figure 4C:
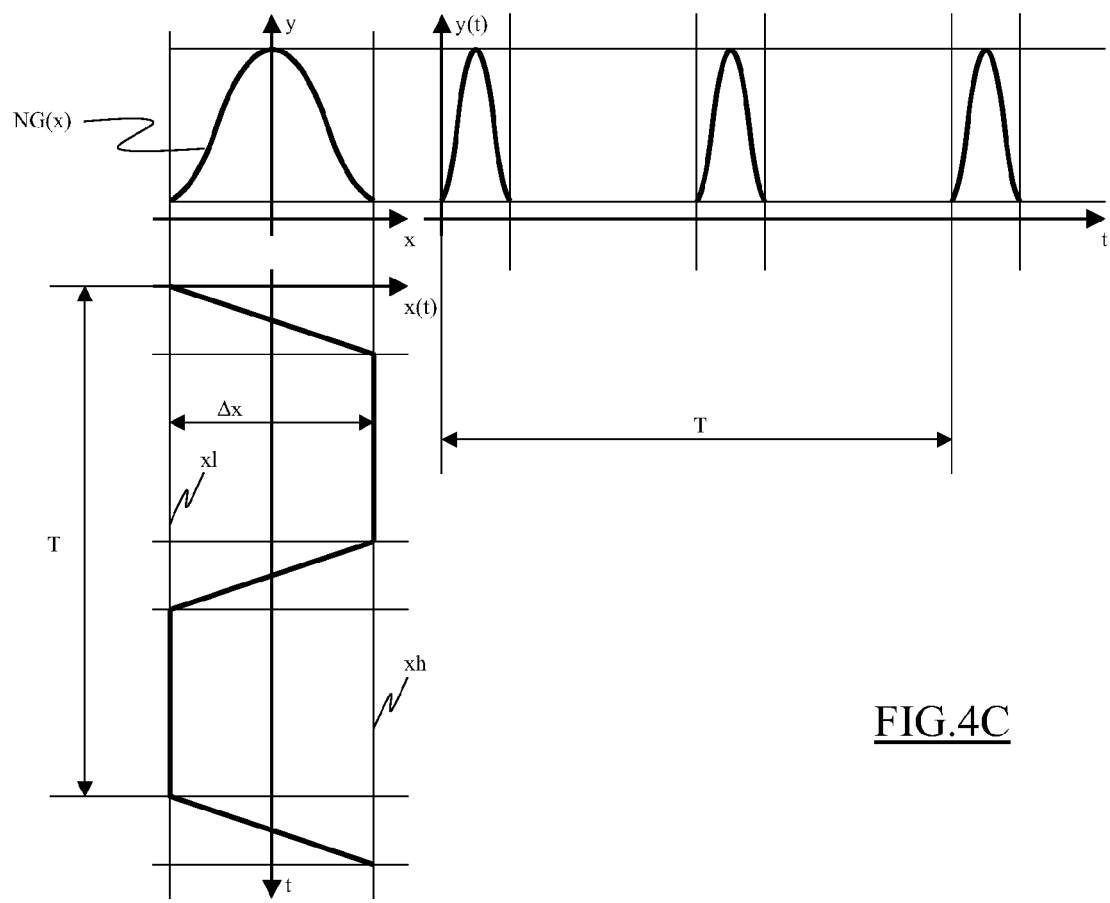

Turning now to FIG. 4C, the effects of an input x variation on the output y are illustrated according to a first example, where it is assumed that the input x varies depending on time t (i.e., x=x(t)) within an interval of values Δx. According to this first example, the input x(t) is a periodic generically rectangular signal of frequency 1/T between a lower value xl and a higher value xh, wherein the difference between the higher value xh and the lower value xl is equal to the interval Δx. Moreover, the input x(t) has a rise time Tr (i.e., the time it takes for x(t) to rise from xl to xh) equal to the fall time Tf (i.e., the time it takes for x(t) to fall from xh to xl).

Figure 4D:
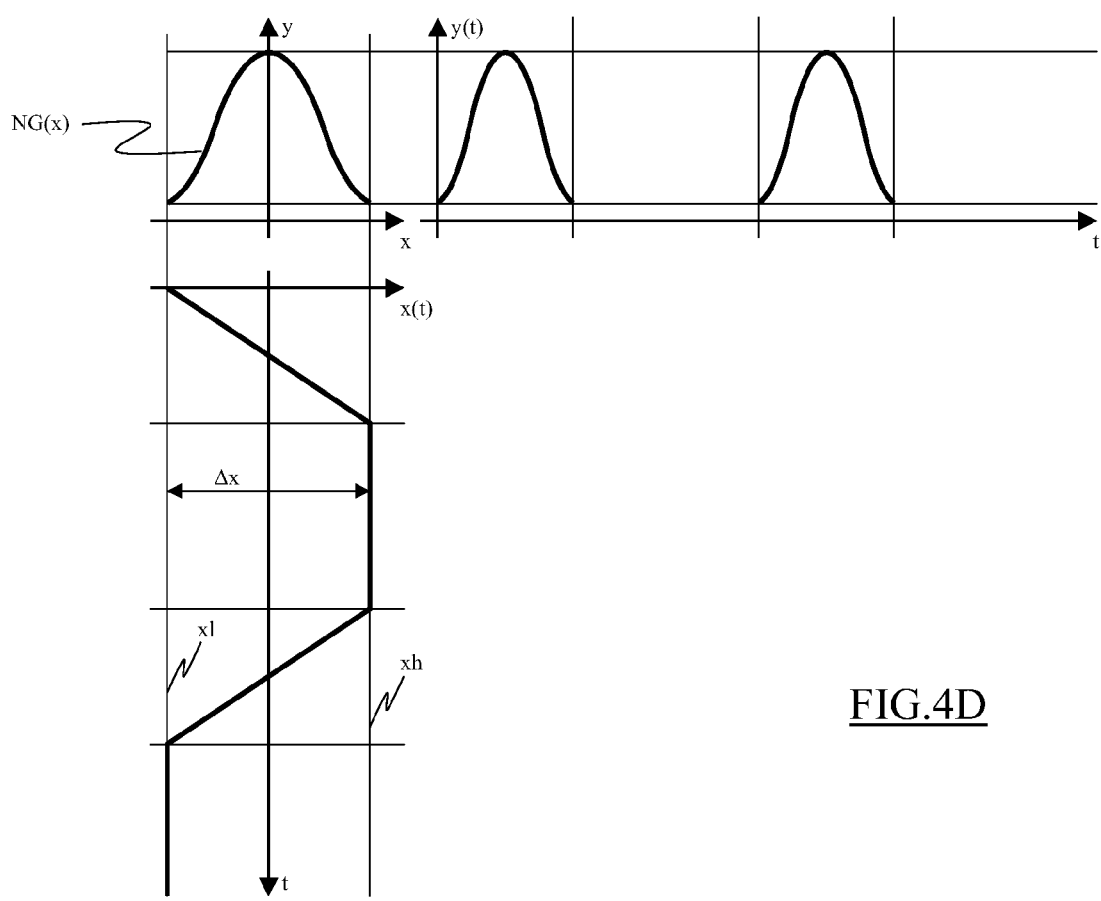

The output y varies over time, i.e. y=y(t), and is in particular a periodic signal having a period T/2 (i.e., half the period of the input x(t)). The output y(t) consists of a train of nearly Gaussian pulses each having the same shape as the transfer characteristic y=NG(x), but, in general, a different duration. More particularly, the output y(t) comprises nearly Gaussian pulses in correspondence of the rising and falling edges of the input x(t); said nearly Gaussian pulses thus have, a time duration equal to the rise/fall times Tr/Tf. By varying, particularly increasing the rise/fall times Tr/Tf, as is illustrated in FIG. 4D, the time durations of the nearly Gaussian pulses of the output y(t) are accordingly varied, particularly increased.

Figure 3A:
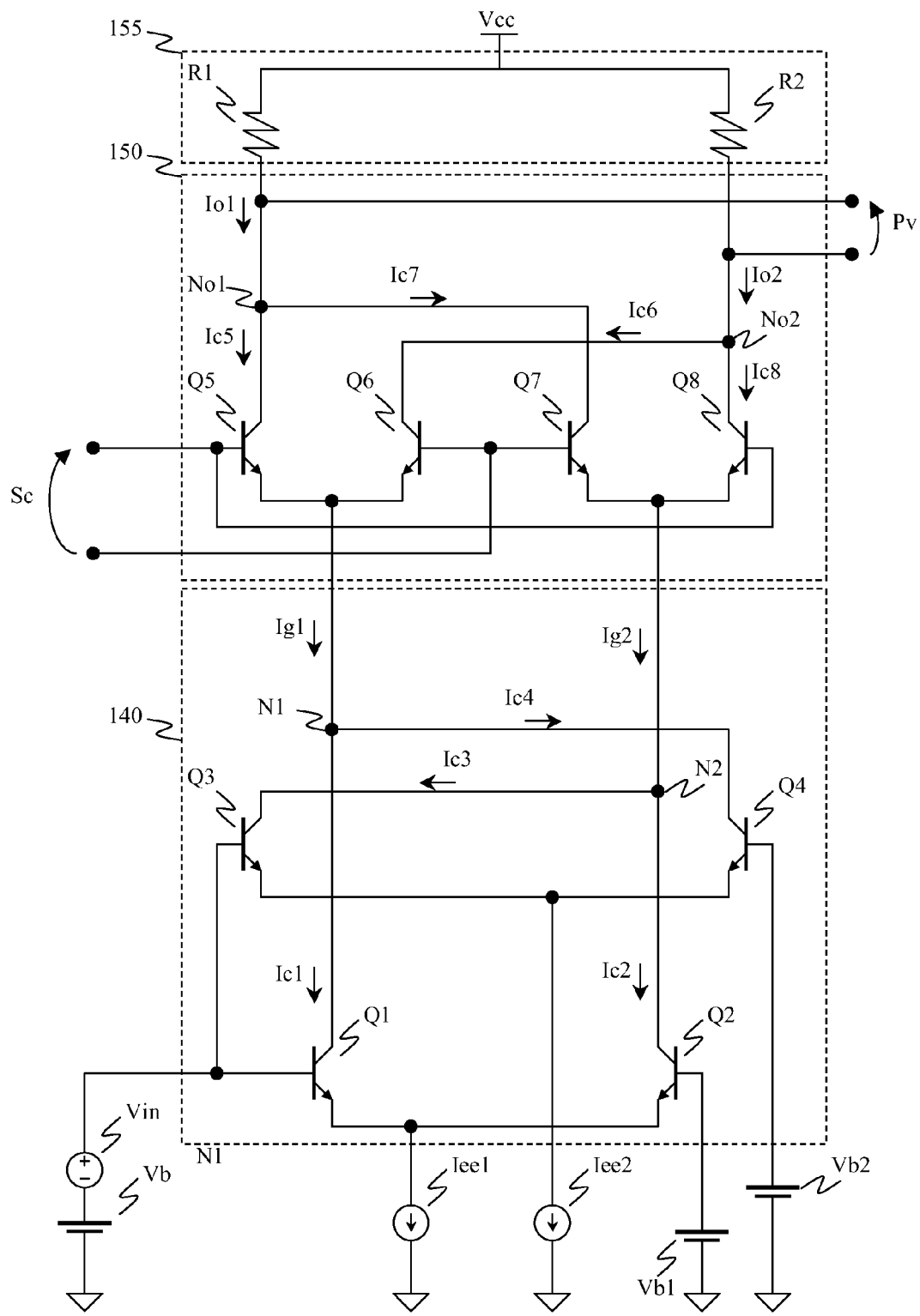
FIG. 3A is a circuit diagram of a UWB pulser according to an embodiment of the present disclosure.

Referring to FIG. 3A, a detailed circuit diagram of the UWB pulser 115 is illustrated. As previously described, the UWB pulser 115 consists of a pulse generator 140 and a multiplier block 150.

The pulse generator 140 comprises a first and a second NPN differential pairs, one having the output terminals cross-coupled to the output terminals of each other. More particularly, the first differential pair comprises two NPN bipolar transistors Q1, Q2, and the second differential pair comprises two NPN bipolar transistors Q3, Q4. The transistors Q1 and Q2 have the emitter terminals coupled to each other, and further coupled to a first biasing current generator, supplying a continuous current Iee1. The transistors Q3 and Q4 have the emitter terminals coupled to each other, and further coupled to a second biasing current generator supplying a continuous current Iee2. The base terminals of the transistors Q1 and Q3 are coupled to the output terminal of the driver circuit block 120, schematized in the drawing as a voltage signal generator generating an input voltage signal Vin series—coupled to a bias voltage generator generating a continuous (DC) voltage Vb; the collector terminal of the transistor Q1 is coupled to the collector terminal of the transistor Q4, forming a circuital node N1. The transistor Q2 has the base terminal coupled to a bias voltage generator supplying a second DC voltage Vb1, and the collector terminal coupled to the collector terminal of the transistor Q3, forming a circuital node N2. The base terminal of the transistor Q4 is coupled to a bias voltage generator generating a third DC voltage Vb2.

The multiplier block 150 comprises a third and a fourth NPN differential pairs coupled to each other. The third differential pair comprises two NPN bipolar transistors Q5, Q6, and the fourth differential pair comprises two NPN bipolar transistors Q7, Q8. The transistors Q5 and Q6 have the emitter terminals coupled to each other and further coupled to the circuital node N1; the transistors Q7 and Q8 have the emitter terminals coupled to each other and further coupled to the circuital node N2. Moreover, the base terminal of the transistor Q5 is coupled to the base terminal of the transistor Q8, and the base terminal of the transistor Q6 is coupled to the base terminal of the transistor Q7. Both the third and the fourth differential pairs are driven by the sinusoidal voltage signal Sc, provided by the sine wave generator block 125 in a differential way. More particularly, the sinusoidal voltage signal Sc is applied between the base terminal of the transistor Q5 (positive input terminal) and the base terminal of the transistor Q6 (negative input terminal). Consequently, the sinusoidal voltage signal Sc is also applied between the base terminal of the transistor Q8 (positive input terminal) and the base terminal of the transistor Q7 (negative input terminal). The transistors Q5 and Q7 have the collector terminals coupled to each other, defining a first output node No1 of the UWB pulser 115. In a similar way, the transistors Q6 and Q8 have the collector terminals one coupled to each other, defining a second UWB pulser output node No2.

A current-to-voltage converter 155 is further provided, attached to the output nodes No1 and No2, including a first and a second resistors R1 and R2, both having a resistance value Rc. The first resistor R1 is coupled between the first output node No1 and a terminal providing the supply voltage Vcc, the second resistor R2 is coupled between the second output node No2 and a terminal providing the supply voltage Vcc.

A differential pair of NPN bipolar transistors exhibits a non-linear transfer characteristic (expressing the differential output current Id as a function of the differential input voltage Vd), having the shape of a hyperbolic tangent:

$$Id = \alpha \cdot Ibias \cdot \tanh\left(\frac{Vd}{2Vt}\right), \tag{2}$$

wherein Ibias is the current biasing the differential pair, $\alpha$ is a proportionality parameter including the saturation current of the transistors, and Vt is the thermal voltage. It is pointed out that for small input voltages Vd (in particular, sufficiently smaller than 2Vt), the transfer characteristic (2) is almost linear, while for large values of Vd the non-linearities of the NPN bipolar transistors reduce the gain of the differential pair and cause the transfer characteristic to bend, thereby obtaining the hyperbolic tangent shape.

The behavior of the pulse generator 140 of FIG. 3A is adapted to generate nearly-Gaussian (current) pulses Ig. In fact, taking account of equation (2) above, defining with Ig1 the current flowing from the emitter terminals of the transistors Q5 and Q6 to the node N1, and defining with Ig2 the current flowing from the emitter terminals of the transistors Q7 and Q8 to the node N2, the differential output current Ig=Ig1−Ig2 of the pulse generator 140 is equal to:

$$Ig = Ig1 - Ig2 = (Ic1 + Ic4 - (Ic2 + Ic3)) = Ic1 - Ic2 - Ic3 + Ic4 == \tag{3}$$
$$\alpha \cdot Iee1 \cdot \tanh\left(\frac{Vid1,2}{2Vt}\right) - \alpha \cdot Iee2 \cdot \tanh\left(\frac{Vid3,4}{2Vt}\right),$$

wherein Ic1, Ic2, Ic3, Ic4 are the collector currents of the transistors Q1, Q2, Q3, Q4, respectively. Vid1,2 is the differential input voltage of the first differential pair, and Vid3,4 is the differential input voltage of the second differential pair. Since:

$$Vid1,2 = Vin + Vb - Vb1; \; Vid3,4 = Vin + Vb - Vb2, \tag{4}$$

wherein the input signal Vin (representing the square wave signal RP generated by the driver circuit block 120) is a square wave signal of period T having rise times Tr and fall times Tf, the equation (3) becomes:

$$Ig = \alpha \cdot Iee1 \cdot \tanh\left(\frac{Vin + Vb - Vb1}{2Vt}\right) - \alpha \cdot Iee2 \cdot \tanh\left(\frac{Vin + Vb - Vb2}{2Vt}\right), \tag{5}$$

which resembles equation (1). The value of the width parameter w of equation (1) depends on how much the biasing of the transistors Q1, Q2, Q3, Q4 unbalances the corresponding two differential pairs. The value of the width parameter w is established in equation (5) by properly setting the voltages Vb, Vb1 and Vb2 according to the following relationships:

$$\frac{Vb - Vb1}{2Vt} = w; \tag{6}$$
$$\frac{Vb - Vb2}{2Vt} = -w.$$

Since equation (5) resembles equation (1), the pulse generator 140 has a transfer characteristic having a nearly Gaussian shape. Thus, the pulse generator 140 is adapted to generate a nearly Gaussian pulse.

The multiplier block 150, having a "Gilbert cell" circuital architecture, is characterized by the following transfer characteristic:

$$Pi = Io1 - Io2 = \alpha \cdot Ig \cdot \tanh\left(\frac{Sc}{2Vt}\right). \tag{7}$$

Io1 and Io2 are the output currents of the multiplier block 150, given by Ic5+Ic7 and Ic6+Ic8, respectively; Ic5, Ic6, Ic7 and Ic8 are the collector currents of the transistors Q5, Q6, Q7 and Q8, respectively; the differential output current of the multiplier block 150, i.e., Io1−Io2, corresponds to the UWB (current) signal pulse.

Defining with Vo1 and Vo2 the voltages at the first and second output nodes No1, No2, respectively, and thanks to the presence of the first and second resistors R1,R2, the differential output voltage of the UWB pulser 115, taken between the first output node No1 (positive terminal) and the second output node No2 (negative terminal) results equal to (supposing that R1=R2=Rc):

$$Vo1 - Vo2 = Vcc - Rc \cdot Io1 - (Vcc - Rc \cdot Io2) = Rc \cdot (Io2 - Io1), \tag{8}$$

Substituting equation (7) in equation (8), the following relationship is $$Vo1 - Vo2 = -\alpha \cdot Rc \cdot Ig \cdot \tanh\left(\frac{Sc}{2Vt}\right) \tag{9}$$

Substituting now equation (5) in equation (9), the previous equation becomes:

$$Vo1 - Vo2 = \alpha^2 \cdot Rc \cdot \left[Iee2 \cdot \tanh\left(\frac{Vin + Vb - Vb2}{2Vt}\right) - \tag{10}$$
$$Iee1 \cdot \tanh\left(\frac{Vin + Vb - Vb1}{2Vt}\right)\right] \cdot \tanh\left(\frac{Sc}{2Vt}\right)$$

By imposing Iee1=Iee2=Iee, equation (10) can be rewritten in the following way:

$$Vo1 - Vo2 = \alpha^2 \cdot Rc \cdot Iee \cdot \Bigg[ \tag{11}$$
$$\tanh\left(\frac{Vin + Vb - Vb2}{2Vt}\right) - \tanh\left(\frac{Vin + Vb - Vb1}{2Vt}\right)\Bigg] \cdot \tanh\left(\frac{Sc}{2Vt}\right)$$

As can be seen observing equation (11), the differential output voltage of the UWB pulser 115 depends both on the input voltage signal Vin (representing the square wave signal RP generated by the driver circuit block 120) and on the sinusoidal voltage signal Sc.

Moreover, when the sinusoidal voltage signal Sc has a low amplitude, where by "low amplitude" there is intended sufficiently lower than the thermal voltage Vt, the previous equation can be simplified. In fact, assuming that:

$$Sc = Vm \cdot \sin(2\pi \cdot fc \cdot t), \tag{12}$$

where Vm is the amplitude of the voltage signal Sc, and assuming that:

$$Vm \cdot \sin(2\pi \cdot fc \cdot t) \ll 2Vt, \tag{13}$$

equation (11) can be approximated in the following way:

$$Pv = Vo1 - Vo2 \cong \frac{\alpha^2 \cdot Rc \cdot Iee \cdot Vm}{2Vt} \cdot \left[ \tanh\left(\frac{Vin + Vb - Vb2}{2Vt}\right) - \tanh\left(\frac{Vin + Vb - Vb1}{2Vt}\right) \right] \cdot \sin(2\pi \cdot fc \cdot t), \quad (14)$$

where the differential output voltage Vo1-Vo2 of the UWB pulser 115 corresponds to the UWB voltage signal Pulse Pv. In fact, as can be seen by equation (14), the UWB voltage signal pulse Pv generated by the UWB pulser 115 is a sinusoidal wave enveloped by a nearly-Gaussian pulse.

As previously mentioned, for being adapted to be exploited in a transmission system, the UWB voltage signal pulse Pv has to be compatible with the strict limitations imposed by the regulatory authorities like the FCC. In this case, the extension of its spectrum Pf has to be restricted within the spectral mask SM. By neglecting possible aliasing effects, an approximated expression of the envelope of the Fourier transform of the module of the UWB voltage signal pulse Pv is:

$$\mathfrak{I}(|Pv|) = Pf \cong \frac{Tr}{T} \cdot \frac{\alpha^2 Iee \cdot Rc \cdot Vm}{V\max} \tanh(w) \sqrt{\sqrt{2}\pi\left(w+\frac{1}{2}\right)} \cdot e^{-\sqrt{2}\left(w+\frac{1}{2}\right)\left(\frac{\pi \cdot Tr \cdot Vt \cdot (f-fc)}{V\max}\right)^2}, \quad (15)$$

wherein Vmax is the highest voltage that the square wave signal RP assumes.

From the previous equation, an inverse proportionality relation exists between the −10 dB (in respect with the frequency fc) band BW of the UWB voltage signal pulse Pv and the rise times Tr of the input voltage signal Vin (i.e., the rise time Tr of the rectangular voltage pulses of the square wave signal RP):

$$BW = \frac{2V\max}{\pi \cdot Vt \cdot Tr} \cdot \sqrt{\frac{\ln\sqrt{10}}{\sqrt{2}\left(w+\frac{1}{2}\right)}}. \quad (16)$$

By making explicit the depending of Vmax on Tr and w, the following relationship is obtained:

$$BW = \frac{2V\max}{\pi \cdot Vt \cdot Tr} \cdot \sqrt{\frac{\ln\sqrt{10}}{\sqrt{2}\left(w+\frac{1}{2}\right)}} \cdot \ln\left(\frac{b-a}{2} + \sqrt{\left(\frac{b-a}{2}\right)^2 - 1}\right), \quad (17)$$

wherein:

$$a = \frac{e^{2w} - e^{-2w}}{p \cdot \tanh(w)}; b = e^{2w} + e^{-2w}, \quad (18)$$

with p that is a ratio term determining the value of Vmax that allows generating a Gaussian pulse having a precision p on the side portions thereof.

In this way, by varying the rise times Tr of the rectangular voltage pulses of the square wave signal RP generated by the driver circuit block 120, it is possible to vary the bandwidth BW of the UWB voltage signal pulse Pv in a reliable way.

Figure 3B:
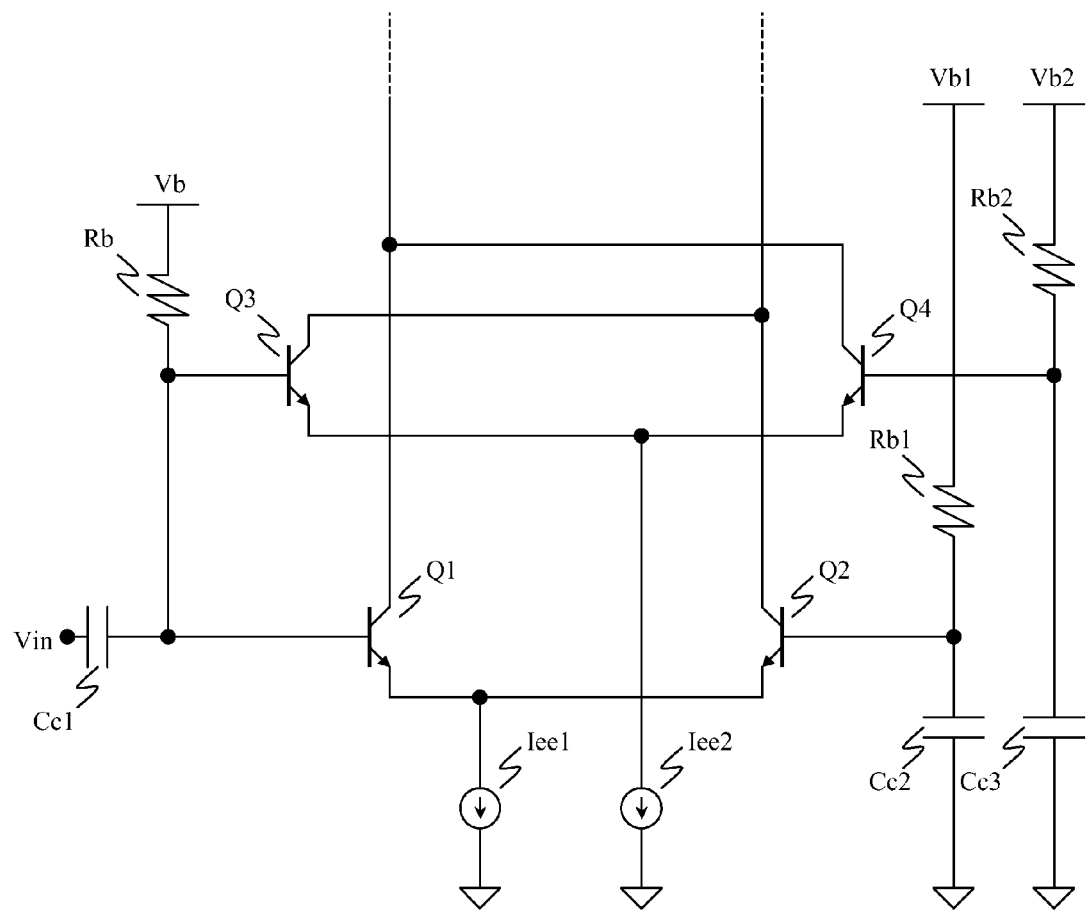
FIGS. 3B-3D are circuit diagrams illustrating a bias network for biasing the UWB pulser according to different and alternative embodiments of the present disclosure.

Referring now to FIG. 3B, an unbalancing circuit for providing the DC Vb, Vb1 and Vb2 to the pulse generator 140 in such a way to unbalance the differential pairs Q1, Q2 and Q3, Q4 according to equation (6) is depicted. More particularly, the input voltage signal Vin (representing the square wave signal RP) is provided to the base terminals of the transistors Q1 and Q3 by means of a first coupling capacitor Cc1, having a first terminal receiving the input voltage signal Vin and a second terminal coupled both to the base terminal of the transistor Q1 and to the base terminal of the transistor Q3. A terminal providing the DC voltage Vb is coupled to the second terminal of the first coupling capacitor Cc1 by means of a biasing resistor Rb. In the same way, a terminal providing the DC voltage Vb1 is coupled to the base terminal of the transistor Q2 by means of a further first biasing resistor Rb1, and a terminal providing the DC voltage Vb2 is coupled to the base terminal of the transistor Q4 by means of a further second biasing resistor Rb2. Moreover, a second and a third coupling capacitors Cc2, Cc3 are included. The second coupling capacitor Cc2 has a first terminal coupled to the base terminal of the transistor Q2 and a second terminal coupled to a terminal providing the ground voltage GND; The third coupling capacitor has a first terminal coupled to the base terminal of the transistor Q4 and a second terminal coupled to a terminal providing the ground voltage GND.

Figure 3C:
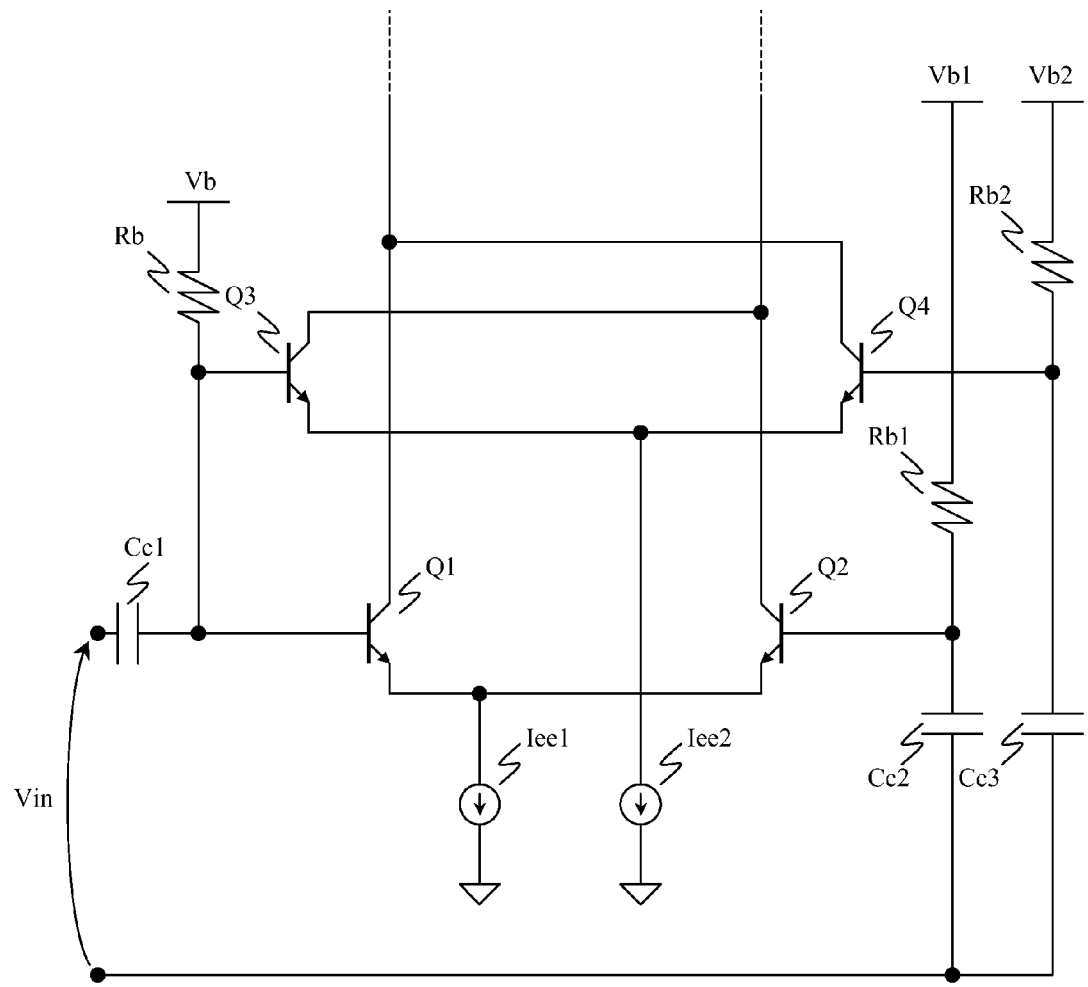

In case the input voltage signal Vin is provided to the to the pulse generator 140 in a differential way, as depicted in FIG. 3C, and according to an embodiment of the present disclosure, the unbalancing circuit is the same as the one depicted in FIG. 3B, but with the second terminals of the second and third coupling capacitors that are coupled to each other, and with the input voltage signal Vin that is applied between the first terminal of the first coupling capacitor Cc1 (positive input terminal) and the second terminals of the second and third coupling capacitors Cc2, Cc3 (negative input terminal).

Figure 3D:
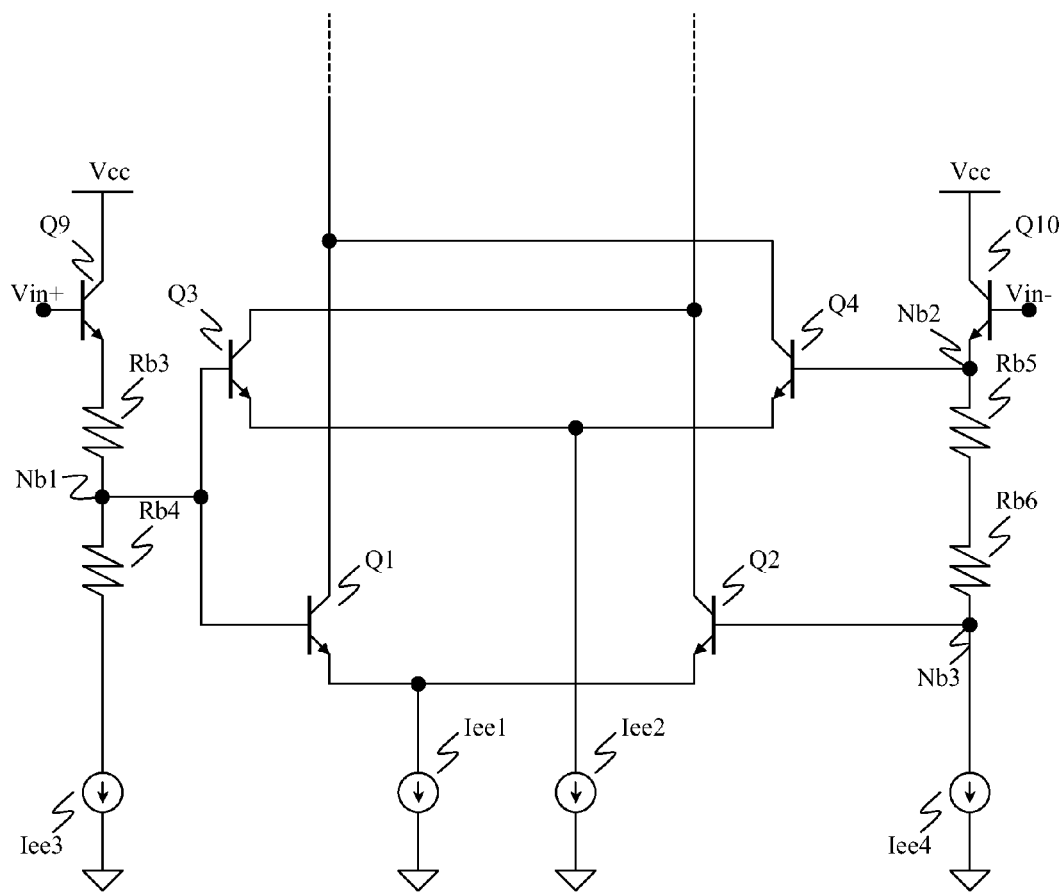

A further embodiment of the unbalancing circuit is depicted in FIG. 3D, in which, as in the previous case, the input voltage signal Vin is provided in a differential way. The input voltage Vin is applied between the base terminal of a NPN bipolar transistor Q9 (positive input terminal) and the base terminal of a further NPN bipolar transistor Q10 (negative output terminal). The transistor Q9 has the collector terminal coupled to a terminal providing the supply voltage Vcc and the emitter terminal coupled to the first terminal of a biasing resistor Rb3. The biasing resistor Rb3 has a second terminal coupled to the base terminals of the transistors Q1 and Q3, forming a circuital node NB1. A further biasing resistor Rb4 has a first terminal coupled to the node NB1, and a second terminal coupled to a biasing current generator providing a continuous current Iee3. The transistor Q10 has the collector terminal coupled to a terminal providing the supply voltage Vcc and the emitter terminal coupled to the base terminal of the transistor Q4, forming a circuital node NB2. A biasing resistor Rb5 has a first terminal coupled to the node NB2, and a second terminal coupled to a first terminal of a further biasing transistor Rb6. The biasing resistor Rb6 has the second terminal coupled to the base terminal of the transistor Q2 and to a biasing current generator providing a continuous current Iee4. The input signal Vin is provided to the inputs of the two differential pairs Q1,Q2 and Q3,Q4 by means of the transistors Q9 and Q10, acting as emitter followers. The unbalancing of the differential pairs is accomplished by the voltage drops generated by the passage of the continuous currents Iee3, Iee4 through the biasing resistors.

Figure 3E:
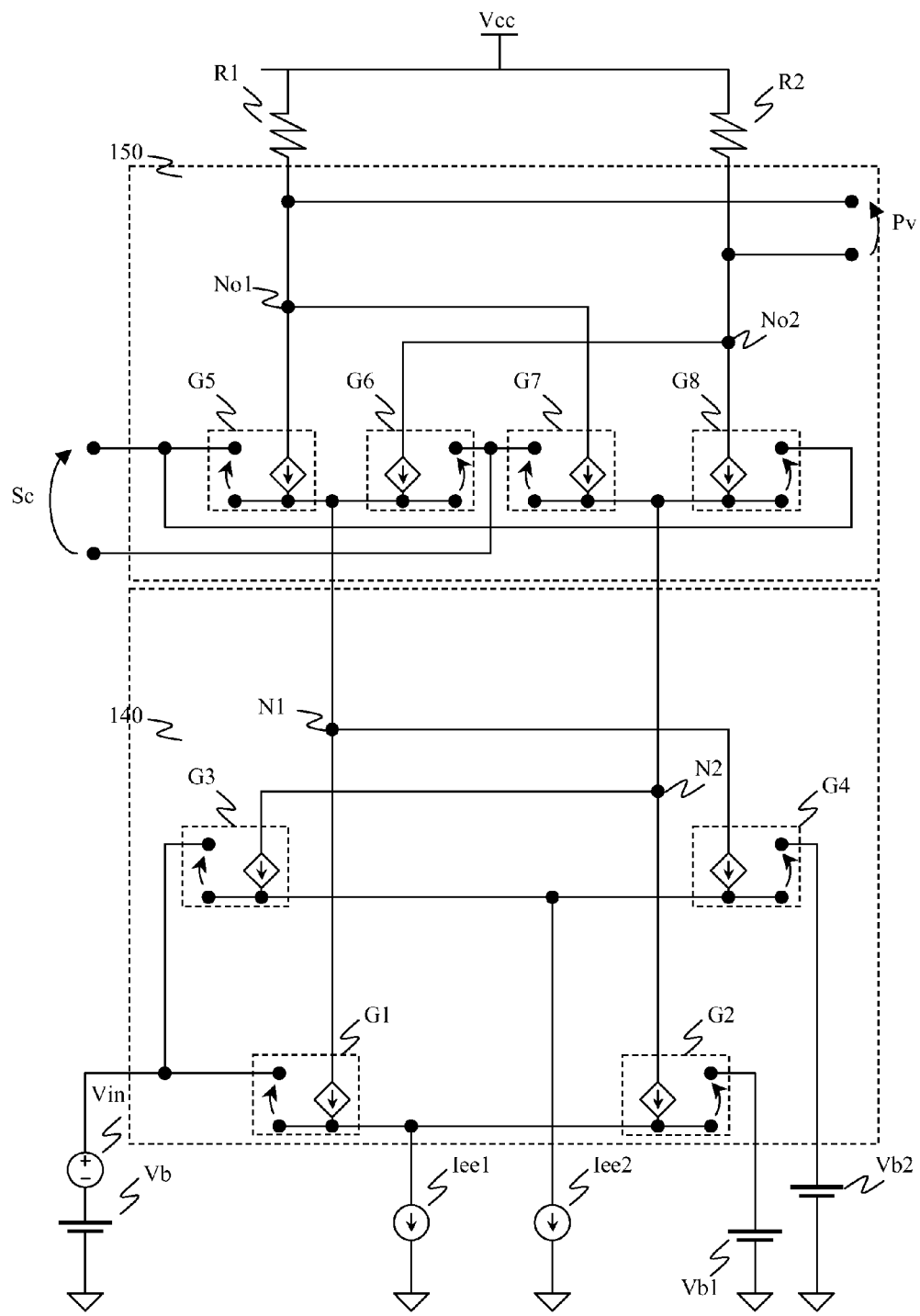
FIGS. 3E-3H are circuit diagrams of the UWB pulser according to different and alternative embodiments of the present disclosure.
Figure 3F:
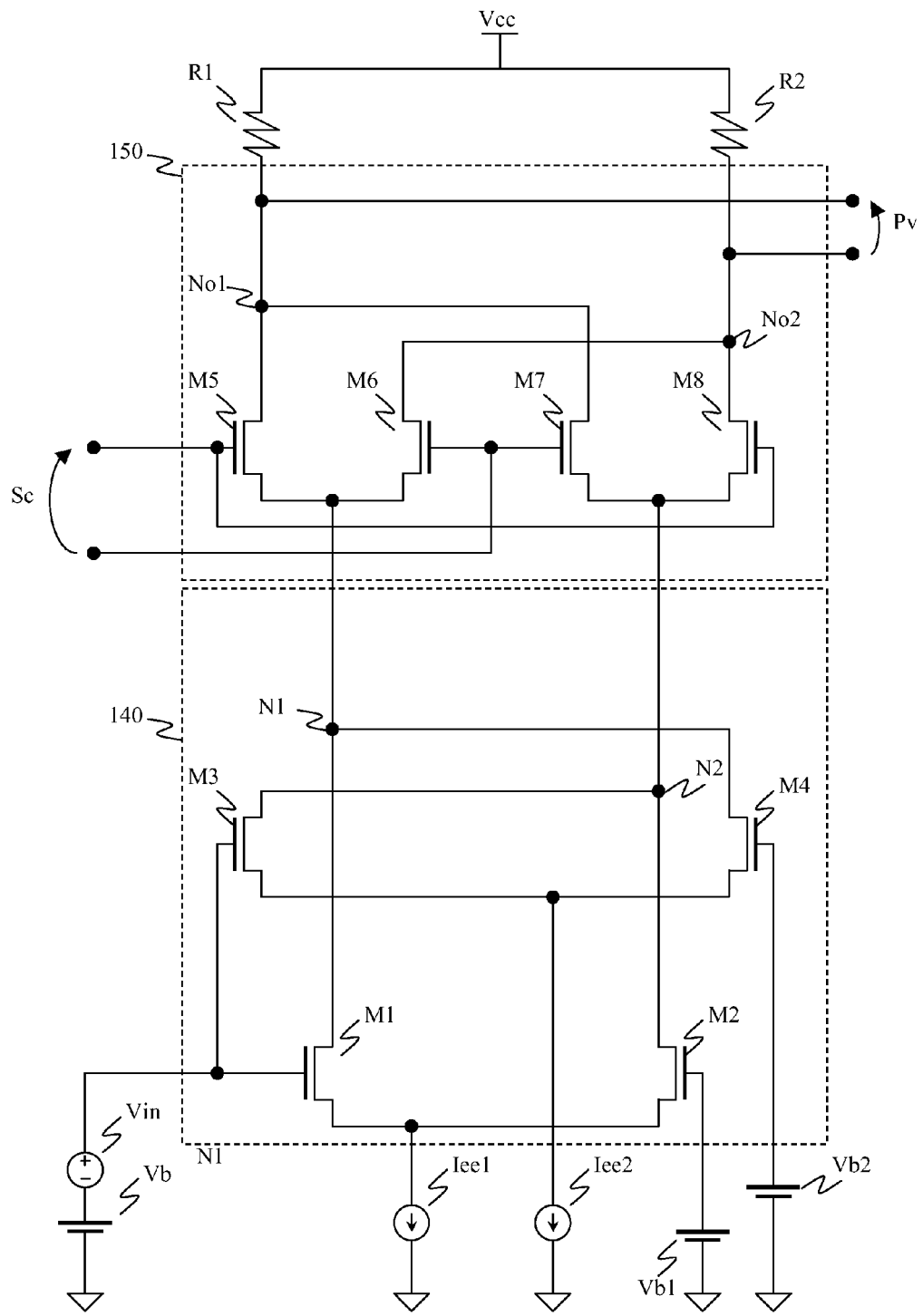

Although the UWB pulser 115 previously described has been implemented using NPN bipolar transistors, alternative solutions are possible. For example, similar results can be achieved if each transistor Q1-Q8 in FIG. 3A is replaced by a corresponding voltage-controlled current generator G1-G8, as depicted in FIG. 3E. From a practical viewpoint, the voltage-controlled current generators may be implemented by MOSFETs, as depicted in FIG. 3F. As can be seen, the circuital architecture is the same as that illustrated in FIG. 3A, with the NPN bipolar transistors Q1-Q8 replaced by n-channel MOSFETs M1-M8.

Figure 3G:
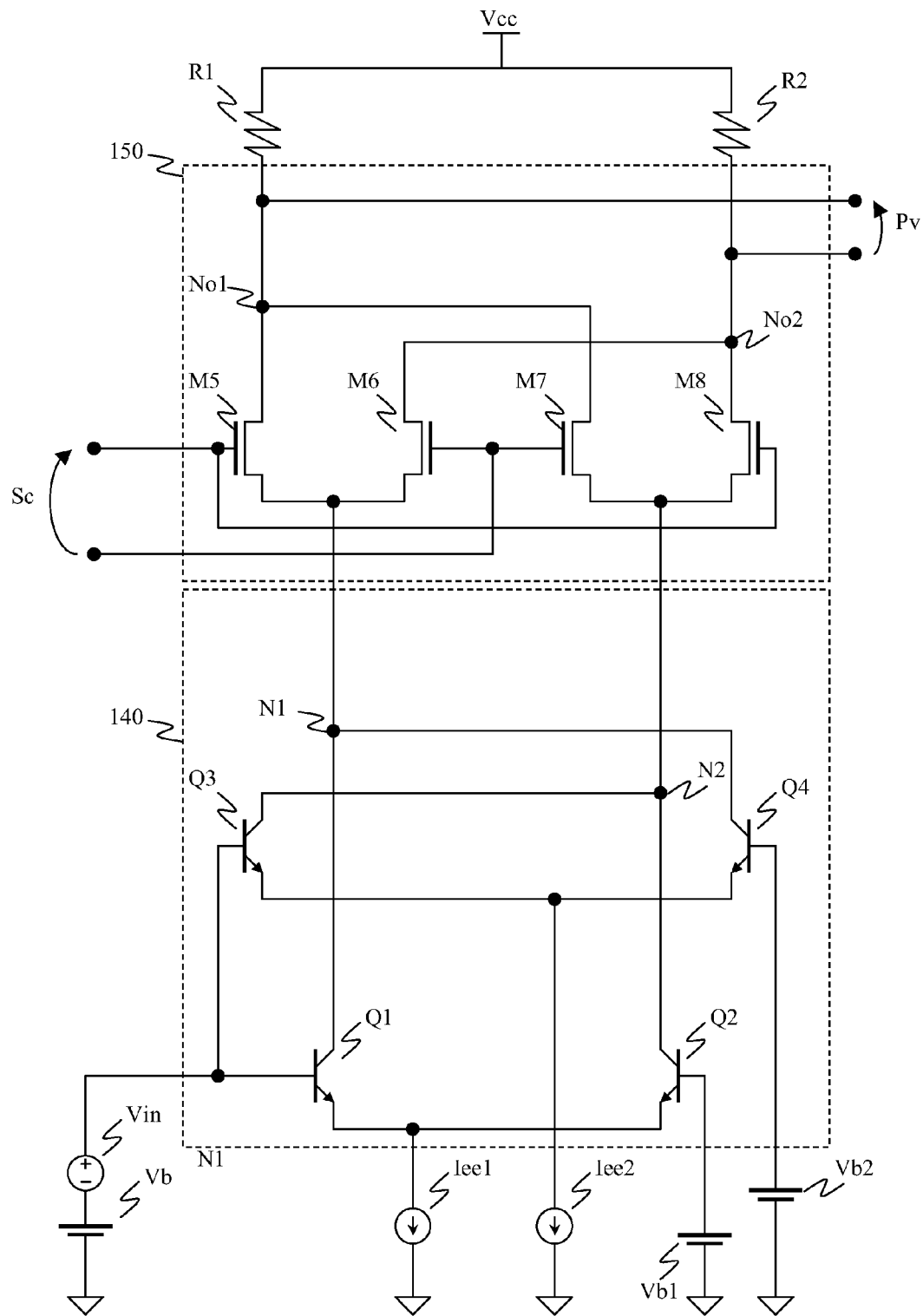
Figure 3H:
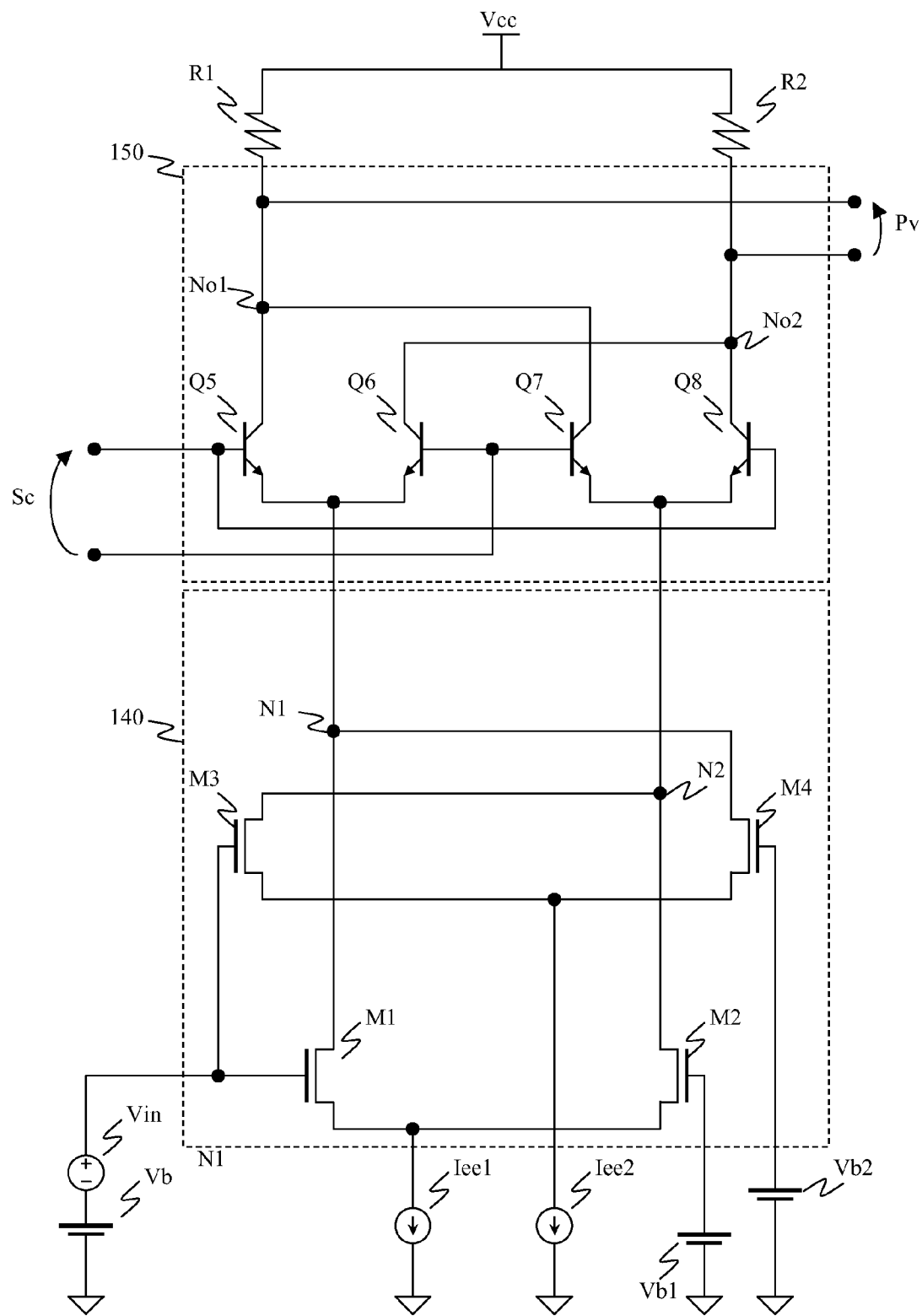

Mixed solutions are also possible: for example, in FIG. 3G the UWB pulser 115 comprises a pulse generator 140 realized with NPN bipolar transistors and a multiplier block 150 realized with MOSFET transistors; in FIG. 3H the UWB pulser 115 comprises a pulse generator 140 realized with MOSFET transistors and a multiplier block 150 realized with NPN bipolar transistors.

As previously mentioned, the UWB pulser 115 converts each transition of the square wave signal provided to its input into a corresponding UWB voltage pulse Pv. Moreover, the time duration of the UWB voltage pulse Pv is uniquely determined by the duration of the rise/fall times Tr/Tf of the square wave signal. Since the −10 dB bandwidth BW of the UWB voltage pulse Pv is inversely proportional to the time duration of the UWB voltage pulse Pv, i.e., to Tr or Tf, the performance in terms of speed and temporal coherence of the driver circuit block 120 needs to be carefully controlled; in particular, it is to be observed that the circuit performances are affected by the fabrication process tolerances.

Figure 5:
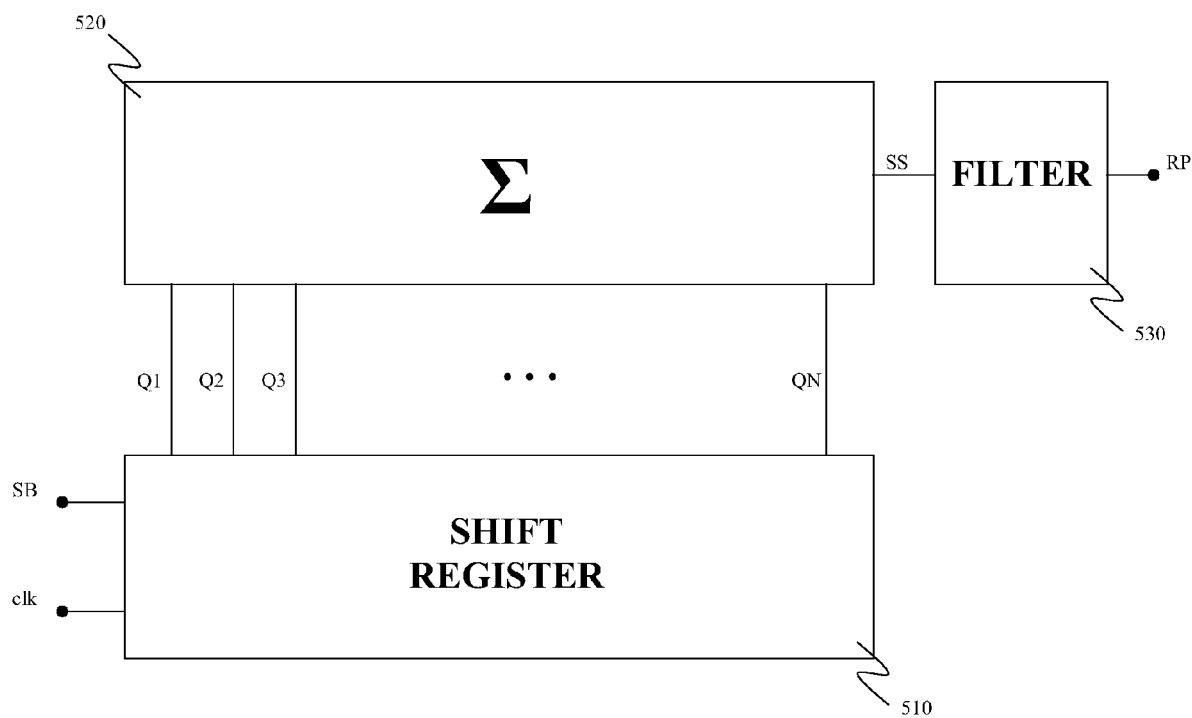
FIG. 5 is a block diagram of a driver circuit block included in the UWB transmitter according to an embodiment of the disclosure.

In FIG. 5, the driver circuit block 120 is depicted according to an embodiment of the present disclosure, in which the duration of the rise/fall times Tr/Tf is constant.

The driver circuit block 120 includes a shift-register 510, a summing network 520 and a low-pass filter 530. The shift register 510 is capable to store a number N of bits $b_i$. It receives from the control block 105 a clock signal clk having a repetition period Tc, necessary for timing all the operation performed by the driver circuit block 120, and the modulated digital signal SB. The shift register 510 provides N output bits Q1, Q2, . . . , QN carried by corresponding output terminals (for convenience, the bits and the corresponding terminals providing them are denoted with the same references) coupled in sequence to N input terminals S1, S2, . . . , SN of the summing network 520.

Data bits $b_i$ are fed by the modulated digital signal SB with a frequency 1/T. The shift register 510 is capable to store an ordinate sequence of N bits, and includes N bistable elements (for example, D-latches implemented with $E^2CL$ technology) timed by the same clock signal clk, one bistable element per bit. Moreover, each bistable element of the shift register 510 is coupled to a corresponding one of the output terminals Q1, Q2, . . . , QN. The bistable elements are coupled in such a way that the output of a generic bistable element (except the last) is coupled to the input of the subsequent bistable element. The bits stored in the shift register 510 moves from the first bistable element (having the output coupled to the output terminal Q1) to the last bistable element (having the output coupled to the output terminal QN), passing from a generic bistable element to a subsequent one at each half period Tc/2 of the clock signal clk.

Since, according to this example, the shift register 510 is implemented with $E^2CL$ technology, the D-latches included therein have a differential circuit structure, and the logic values "1", "0" are associated with a high logic voltage Vh (e.g., equal to 275 mV) and a low logic voltage Vl (e.g., equal to −275 mV), respectively. Consequently, also the modulated digital signal has to be properly adapted, by means of a voltage shifter circuit not shown in the Figure, before being provided to the input of the shift register 510. In the starting condition, it is supposed that the modulated digital signal SB and the output bits Q1, Q2, . . . , QN are at the low logic voltage Vl. When the modulated digital signal SB assumes the high logic voltage Vh during a half period Tc/2, at the subsequent half period the output bit Q1 assumes the high logic voltage Vh (i.e., it assumes the "1" logic value). If the modulated digital signal SB is maintained at the high logic voltage Vh for at least N/2 periods Tc, the input variation is transferred to all the N output terminals; consequently, at the end of N/2 periods Tc, all the output bits Q1, Q2, . . . , QN are at the high logic voltage Vh (i.e. they are all at the "1" logic value).

The summing network 520 includes an output terminal providing a sum signal SS to the low-pass filter 530. The sum signal SS is an analog voltage signal which value is proportional to the number of output bits Q1, Q2, . . . , QN that are at the high logic voltage Vh:

$$SS = k \cdot (Q1 + Q2 + \ldots + QN), \quad (19)$$

wherein k is a constant parameter. For example, for implementing the function expressed in equation (19) a number N of NPN differential pairs coupled to a same pair of resistors can be used. The sum signal SS takes the highest value when all the output bits Q1, Q2, . . . , QN are at the "1" logic value, and is equal to:

$$SS_{MAX} = k \cdot N \cdot V_h. \quad (20)$$

Figure 6:
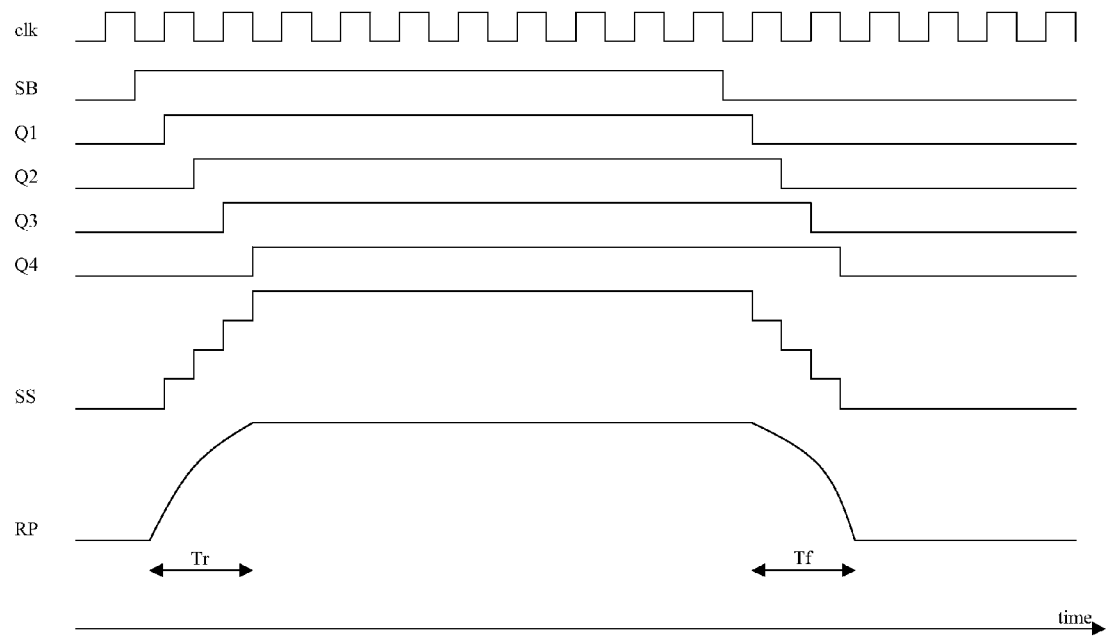
FIG. 6 is an exemplary diagram showing waveforms of the signals involved in the functioning of the driver circuit shown in FIG. 5.

FIG. 6 illustrates the time trends of all the signals involved in the generation of a single rectangular voltage pulse of the square wave signal RP, in the exemplary case of a 4-bit shift register 510. In this case, the sum signal SS is a rectangular voltage pulse having staircase-like rising/falling edges with rise/fall times Tr/Tf equal to two times the period Tc.

The low pass-filter 530 (that will not be described in detail, because not relevant to the scope of the present disclosure) includes an output terminal, for providing the square wave signal RP to the UWB pulser 115. In fact, by providing the sum signal SS to the low-pass filter 530, the rising/falling edges of the rectangular voltage pulse are smoothed, and their trends become nearly linear, as required for properly driving the UWB pulser 115.

According to a further embodiment of the present disclosure, the driver circuit block 120 is adapted to be controlled by the control block 105 in such a way to vary the duration of the rise/fall times Tr/Tf and, consequently, to adjust the width of the UWB voltage pulses Pv. Since the sum signal SS is a rectangular voltage pulse having staircase-like rising/falling edges with rise/fall times Tr/Tf that depend on the period Tc of the clock signal clk, a method for varying the rise/fall times Tr/Tf consists of directly adjusting the period Tc.

Moreover, the rising/falling edges of the signal RC may be non linear. In fact, referring back to FIGS. 4C and 4D, and considering again the generic input x and the generic output y related by the nearly-Gaussian transfer characteristic y=NG (x), a non-linear variation of the input x allows to change the shape of the output y(t). Since the shape variation of a pulse in the time domain implies a corresponding shape variation of its spectrum in the frequency domain, the possibility of having non linear rising/falling edges can be very useful for adjusting the spectrum Pf of the UWB voltage pulses Pv in a carefully controlled way. For example, a driver circuit block 120 adapted to generate rectangular voltage pulses with non linear rising/falling edges can be implemented by means of a multivibrator circuit, or by properly modifying the contributions of the bits provided by the shift register.

According to a further embodiment of the present disclosure, the sine wave generator block 125 (FIG. 1) may generate a signal Sc that is the sum of a plurality of (at least two, more generally) P of sinusoidal waves Sc1, Sc2, . . . ScP, of different frequencies fc1, fc2, . . . , fcP. In this way, the spectrum of the signal Sc has a corresponding plurality P of harmonics. If the frequencies fc1, fc2, ..., fcP are sufficiently spaced from each other, the spectrum of the UWB signal pulse Pv consists of P replicas of the spectrum Pf of the nearly-Gaussian pulse Ig, each replica having a center frequency equal to a corresponding one among the frequencies fc1, fc2, ..., fcP. Conversely, when the frequencies fc1, fc2, ..., fcP are sufficiently close, said P replicas of the spectrum Pf are mutually influenced: the resulting spectrum has a wider width with respect to spectrum Pf of the nearly-Gaussian pulse Ig.

Naturally, in order to satisfy local and specific requirements, a person skilled in the art may apply to the solution described above many modifications and alterations. Particularly, although the present disclosure has been described with a certain degree of particularity with reference to preferred embodiment(s) thereof, it should be understood that various omissions, substitutions and changes in the form and details as well as other embodiments are possible; moreover, it is expressly intended that specific elements and/or method steps described in connection with any disclosed embodiment of the disclosure may be incorporated in any other embodiment as a general matter of design choice.

The UWB transmitter 100 of FIG. 1 may be utilized in a variety of different types of electronic communications systems such as wireless communications systems contained in a variety of different types of electronic devices such as consumer electronic devices like telephones and portable digital assistants (PDAs).

What is claimed is:

1. A pulse generator comprising:
   an input adapted to receive an input signal having non-linear rising edges and non-linear falling edges; and
   a circuit operable to develop an output pulse signal responsive to the input signal, the output pulse signal having a shape and the pulse generator having a non-linear transfer characteristic with a shape that is substantially the same as the shape of the output pulse signal.

2. The pulse generator circuit of claim 1 wherein the transfer characteristic comprises a nearly-Gaussian shaped transfer characteristic.

3. The pulse generator of claim 1 wherein the input signal comprises a square wave signal having a rise time associated with a rising edge of the square wave signal and a fall time associated with a falling edge of the square wave signal, and wherein the pulse generator is operable to generate a respective output pulse signal responsive to each rising edge of the square wave signal and a respective output pulse signal responsive to each falling edge of the square wave signal, and wherein shape of the output pulse signal is a function of the rise and fall times of the square wave signal.

4. An electronic system, comprising:
   an electronic subsystem including a pulse generator adapted to receive an input signal including at least one non-linear edge and operable to develop an output pulse signal responsive to the input signal, the output pulse signal having a shape and the pulse generator having a non-linear transfer characteristic with a shape that is substantially the same as the shape of the output pulse signal.

5. The electronic system of claim 4 wherein the electronic subsystem comprises a consumer electronic device.

6. The electronic system of claim 5 wherein the consumer electronics device comprises a wireless transmitter containing the pulse generator.

7. A method of generating output pulse signals in response to an input signal, the method comprising:
   receiving the input signal at a receiver;
   generating a driving signal having at least one ramp at a driver circuit in response to the input signal;
   defining a non-linear transfer characteristic having a nearly Gaussian shape that corresponds to a desired shape of each output pulse signal;
   applying the non-linear transfer characteristic to the driving signal; and
   generating a respective output pulse signal on an output of the receiver from the operation of applying the non-linear transfer characteristic to the driving signal and responsive to a feature of the input signal.

8. The method of claim 7 wherein defining a non-linear transfer characteristic comprises:
   defining a first non-linear sub transfer characteristic;
   defining a second non-linear sub transfer characteristic;
   combining the first and second sub non-linear transfer characteristics to define the non-linear transfer characteristic.

9. The method of claim 8 wherein each of the first and the second non-linear sub transfer characteristics comprises hyperbolic tangent function.

10. The method of claim 7 wherein the input signal comprises a square wave signal having a rise time associated with a rising edge of the square wave signal and a fall time associated with a falling edge of the square wave signal, and wherein the method further comprises:
    generating a respective output pulse signal responsive to each rising edge of the square wave signal;
    generating a respective output pulse signal responsive to each falling edge of the square wave signal; and
    adjusting the rise and fall times of the square wave signal; and
    adjusting the shape of the output pulse signal as a function of the rise and fall times of the square wave signal.

11. A system, comprising:
    a pulse generator adapted to receive the input signal and operable to develop an output pulse signal responsive to the input signal, the output pulse signal having a shape and the pulse generator having a non-linear transfer characteristic with a shape that is substantially the same as the shape of the output pulse signal; and
    a driver circuit adapted to generate the input signal in the form of a ramp signal.

12. The electronic system of claim 11, wherein the driver circuit is adapted to generate the input signal in the form of a linear ramp signal.

13. The electronic system of claim 11, wherein the driver circuit is controllable for varying a slope of the linear ramp signal.

14. The electronic system of claim 11, wherein said driver circuit is adapted to generate the input signal in the form of a non-linear signal.

15. The electronic system of claim 11, wherein the pulse generator circuit further includes:
    a first electronic circuit having a first non-linear transfer characteristic,
    a second electronic circuit having a second non-linear transfer characteristic;
    said first and second electronic circuits being coupled one to the other in such a way that the first non-linear transfer characteristic is combined with the second non-linear transfer characteristic to produce the transfer characteristic of the pulse generator circuit.

16. The electronic system of claim 15, wherein the transfer characteristic of the pulse generator circuit has a generically Gaussian shape.

17. The electronic system of claim 16, wherein the first and the second non-linear transfer characteristics of the first and the second electronic circuits of the pulse generator circuit have each generically a shape of a hyperbolic tangent.

* * * * *